United States Patent
Okane et al.

(10) Patent No.: US 9,278,399 B2
(45) Date of Patent: Mar. 8, 2016

(54) POWER SUPPLY DEVICE FOR ELECTRIC DISCHARGE MACHINING APPARATUS AND ELECTRIC DISCHARGE MACHINING METHOD

(75) Inventors: Masahiro Okane, Tokyo (JP); Satoshi Suzuki, Tokyo (JP); Kiyohito Oda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/980,466

(22) PCT Filed: Apr. 12, 2011

(86) PCT No.: PCT/JP2011/059077
§ 371 (c)(1),
(2), (4) Date: Jul. 18, 2013

(87) PCT Pub. No.: WO2012/140735
PCT Pub. Date: Oct. 18, 2012

(65) Prior Publication Data
US 2013/0292360 A1 Nov. 7, 2013

(51) Int. Cl.
*B23H 1/00* (2006.01)
*B23H 1/02* (2006.01)

(52) U.S. Cl.
CPC ............ *B23H 1/022* (2013.01); *B23H 2300/20* (2013.01)

(58) Field of Classification Search
CPC ............................ B23H 1/022; B23H 2300/20
USPC ........ 219/69.13, 69.17, 69.18, 69.19, 137 PS, 219/69.11, 69.112, 69.14
See application file for complete search history.

(56) References Cited

U.S. PATENT DOCUMENTS

| | | | | |
|---|---|---|---|---|
| 3,777,108 A | * | 12/1973 | Maillet | ...................... 219/69.18 |
| 4,655,888 A | | 4/1987 | Kilcher et al. | |
| 4,967,054 A | * | 10/1990 | Obara et al. | ................ 219/69.13 |
| 5,374,798 A | * | 12/1994 | Kinbara | ...................... 219/69.18 |

(Continued)

FOREIGN PATENT DOCUMENTS

| | | |
|---|---|---|
| DE | 2113827 | 10/1971 |
| JP | 61-56825 A | 3/1986 |

(Continued)

OTHER PUBLICATIONS

Chinese Office Action in Chinese Application No. 201180070056.9 mailed Jun. 27, 2014.

(Continued)

*Primary Examiner* — Dana Ross
*Assistant Examiner* — Joseph Iskra
(74) *Attorney, Agent, or Firm* — Sughrue Mion, PLLC; Richard C. Turner (57) ABSTRACT

The present invention is equipped with a series circuit that includes a DC power supply, switching elements and a diode for supplying DC or AC current pulses to a machining gap between a machining electrode and a workpiece, diodes that regulate a direction of the current flow to one direction, and a control unit that controls the switching elements. When the control unit generates a current pulse having a triangular waveform by an inductance that is present in the series circuit, the control unit controls the switching elements in order that a current-pulse time ratio that is a ratio between the non-current time and the current continuation time in the current pulse is equal to or lower than 1/5.

9 Claims, 9 Drawing Sheets

(56) References Cited

U.S. PATENT DOCUMENTS

| | | |
|---|---|---|
| 7,645,958 B2 | 1/2010 | Oda et al. |
| 8,168,914 B2 * | 5/2012 | Suzuki et al. ............... 219/69.18 |
| 2003/0030385 A1 * | 2/2003 | Toyama ........................ 315/291 |
| 2006/0054600 A1 * | 3/2006 | Satou et al. ................. 219/69.18 |
| 2007/0289949 A1 * | 12/2007 | Suzuki et al. ............... 219/69.13 |
| 2008/0017614 A1 * | 1/2008 | Oda et al. .................... 219/69.13 |
| 2011/0220615 A1 | 9/2011 | Yamada et al. |

FOREIGN PATENT DOCUMENTS

| | | |
|---|---|---|
| JP | 3-55117 A | 3/1991 |
| JP | 5-208316 A | 8/1993 |
| JP | 5-85520 U | 11/1993 |
| JP | 2914123 B2 | 6/1999 |
| JP | 2003-181724 A | 7/2003 |
| JP | 2010-201521 A | 9/2010 |
| WO | 2006/046599 A1 | 5/2006 |

OTHER PUBLICATIONS

German Office Action dated Oct. 30, 2013 issued in corresponding German Application No. 11 2011 104 971.4.

* cited by examiner

POWER SUPPLY DEVICE FOR ELECTRIC DISCHARGE MACHINING APPARATUS AND ELECTRIC DISCHARGE MACHINING METHOD

CROSS REFERENCE TO RELATED APPLICATIONS

This application is a National Stage of International Application No. PCT/JP2011/059077, filed on Apr. 12, 2011, the contents of all of which are incorporated herein by reference in their entirety.

FIELD

The present invention relates to a power supply device for an electric discharge machining apparatus and an electric discharge machining method.

BACKGROUND

Patent Literatures 1 and 2 mentioned below are examples of literature on conventional techniques that are related to a power supply device for an electric discharge machining apparatus.

For a power supply device for an electric discharge machining apparatus described in Patent Literature 1, there is disclosed a technique in which switching elements that interrupt a pulse train having a predetermined repetitive frequency at a predetermined interval are driven to supply AC pulse current to a machining gap between a machining electrode and a workpiece to which a capacitor is connected in parallel, thereby completely discharging the electric charge of the capacitor to the machining gap to prevent arc current from continuously flowing, and thus improve surface roughness during electric discharge machining.

Furthermore, a power supply device for an electric discharge machining apparatus described in Patent Literature 2 is configured to include a DC power supply that supplies DC pulse current to a machining gap between a machining electrode and a workpiece, a series circuit constituted by switching elements and a resistor, a capacitor connected in parallel to the machining electrode and the workpiece, and an electric discharge detector that detects occurrence of electric discharge in the machining gap. For the power supply device for an electric discharge machining apparatus in Patent Literature 2, there is disclosed a technique in which an on/off control is repeated on the switching element, in which the switching element is turned on by a pulse width equal to or smaller than the pulse width of the discharge current of the capacitor, and is turned off for a predetermined time, and repeated until the capacitor discharges and the electric discharge detector detects the electric discharge, and the on/off control is repeated again after a predetermined off-time following the detection of the electric discharge by the electric discharge detector. According to the power supply device for an electric discharge machining apparatus in Patent Literature 2, an electric current having a pulse width equal to or larger than the electric discharge pulse width of the capacitor is not supposed to flow through a gap between the machining electrode and the workpiece (hereinafter, "machining gap") in order to prevent an arc current from continuously flowing, similarly to Patent Literature 1 (see FIGS. 2 and 11).

CITATION LIST

Patent Literatures

Patent Literature 1: Japanese Patent Application Laid-open No. 03-55117
Patent Literature 2: Japanese Patent No. 2914123

SUMMARY

Technical Problem

The power supply devices for an electric discharge machining apparatus in Patent Literatures 1 and 2 mentioned above are configured to necessarily include a resistor between the DC power supply and the machining electrode. Therefore, there is a problem in that when the machining current is high, the amount of heat generated by the resistor becomes large, and the amount of heat generated by the device is increased.

The power supply device for an electric discharge machining apparatus in Patent Literature 2 mentioned above uses, a method in which a pulse width of a current flowing through the machining gap is restricted to being as short a time period as possible, thereby preventing an arc current from continuously flowing. Therefore, there is a problem in that there is a non-current time equal to or longer than a given time, during which a discharge current does not flow through the machining gap, and accordingly the machining speed cannot be significantly increased.

The present invention has been achieved to solve the above problems, and an object of the present invention is to provide a power supply device for an electric discharge machining apparatus and an electric discharge machining method that can increase machining speed and suppress an increase in the amount of heat generated when compared to conventional devices.

Solution to Problem

In order to solve the aforementioned problems, a power supply device for an electric discharge machining apparatus is configured in such a manner as to include: a series circuit that includes a DC power supply and switching elements for supplying DC or AC current pulses to a machining gap between a machining electrode and a workpiece; and a control unit that controls the switching elements, wherein when the control unit generates a current pulse having a triangular waveform by an inductance component that is present on the series circuit, the control unit controls the switching elements in order that the current-pulse time ratio, which is a ratio between non-current time and current continuation time in the current pulse, is equal to or lower than 1/5.

Advantageous Effects of Invention

According to the present invention, the machining speed can be increased, and an increase in a heat generation amount can also be suppressed when compared to conventional devices.

DESCRIPTION OF EMBODIMENTS

Exemplary embodiments of a power supply device for an electric discharge machining apparatus and an electric discharge machining method according to the present invention will be explained below in detail with reference to the accompanying drawings. The present invention is not limited to the embodiments.

First Embodiment

Figure 1:
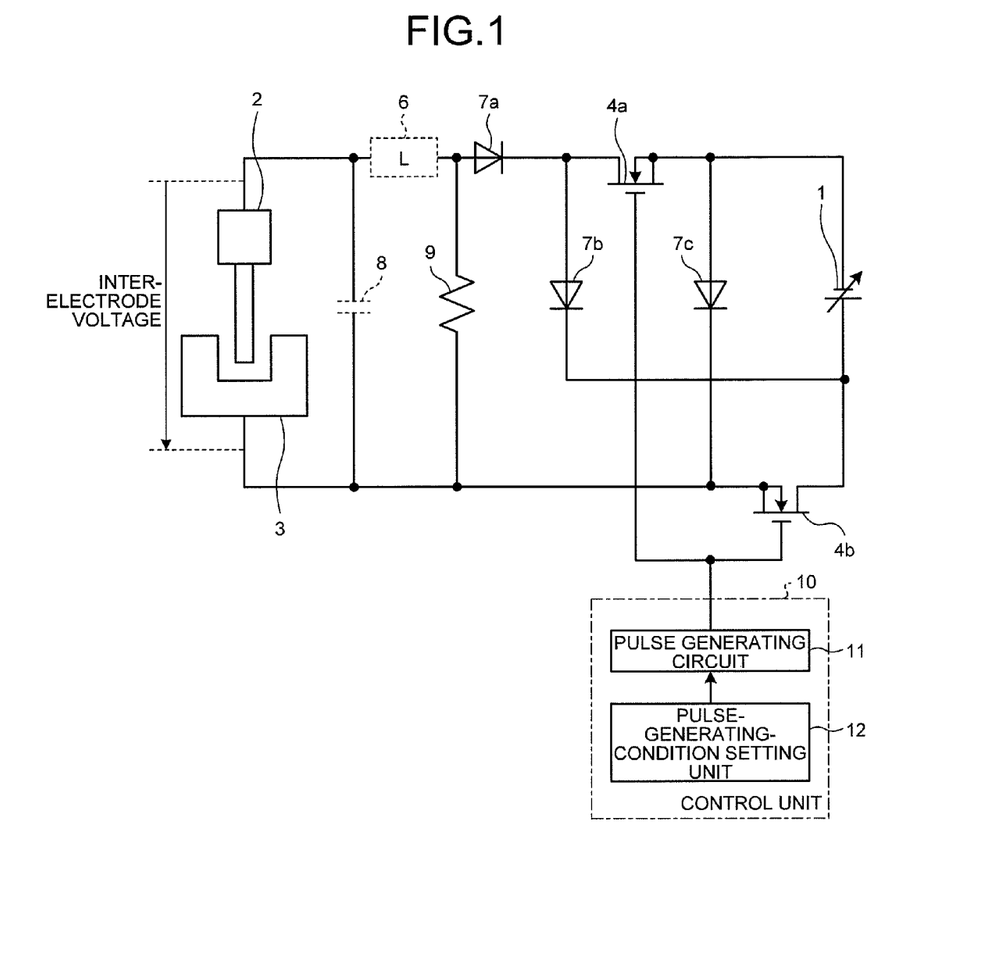
FIG. 1 is a configuration example of an electric discharge machining apparatus including a power supply device for an electric discharge machining apparatus according to a first embodiment.

FIG. 1 is a configuration example of an electric discharge machining apparatus including a power supply device for an electric discharge machining apparatus according to a first embodiment. The power supply device for an electric discharge machining apparatus according to the first embodiment is configured by including a DC power supply 1, switching elements 4a and 4b, diodes 7a to 7c, a resistance 9, and a control unit 10.

In FIG. 1, a workpiece 3 and a machining electrode 2 (a mold electrode in the case of a small-hole electric discharge machining apparatus and a die-sinking electric discharge machining apparatus, or a wire in the case of a wire electric discharge machining apparatus) are connected to the DC power supply 1 through the switching elements 4a and 4b (field-effect transistors (FETs) are exemplified), the diode 7a, and an inductance 6. The source end of the switching element 4a is connected to the negative electrode of the DC power supply 1. The drain end of the switching element 4a is connected to the cathode end of the diode 7a. The source end of the switching element 4b is connected to the workpiece 3, and the drain end of the switching element 4b is connected to the positive electrode of the DC power supply 1. The inductance 6 is a parasitic inductance component that is present on a current path, and it is shown by a broken line in FIG. 1 as the component that is generated between an anode end of the diode 7a and the machining electrode 2. The diode 7a is not an essential constituent element and thus it can be omitted.

The diodes 7b and 7c are elements that, along with the diode 7a, regulate the direction of a current flow to one direction. The anode end of the diode 7b is connected to a connection end between the switching element 4a and the diode 7a. The cathode end of the diode 7b is connected to the positive electrode of the DC power supply 1. The cathode end of the diode 7c is connected to a connection end between the switching element 4b and the workpiece 3. The anode end of the diode 7c is connected to a connection end between the negative electrode of the DC power supply 1 and the switching element 4a.

Between the workpiece 3 and the machining electrode 2, there are a stray capacitance component and a wiring capacitance component that are determined by the shape and the size of the workpiece 3 and the machining electrode 2 or by the distance between the workpiece 3 and the machining electrode 2 (an inter-electrode distance), or the like. Therefore, this stray component is shown by a broken line in FIG. 1 as a stray capacitance 8 connected between one end of the workpiece 3 and one end of the machining electrode 2.

Meanwhile, the control unit 10 is a constituent unit that executes an on/off control on the switching elements 4a and 4b, and it is configured by including a pulse generating circuit 11 and a pulse-generating-condition setting unit 12. The pulse-generating-condition setting unit 12 sets an externally-input machining condition, and various conditions that are set based on the machining condition (for example, the machining time, the machining current, the timing at which the switching elements 4a and 4b are turned on, and the on/off-time ratio of the switching elements 4a and 4b (a ratio of the off-time relative to the on-time: off-time/on-time)). The pulse generating circuit 11 generates a control signal for turning the switching elements 4a and 4b on/off based on a signal from the pulse-generating-condition setting unit 12 to control the switching elements 4a and 4b.

Figure 2:
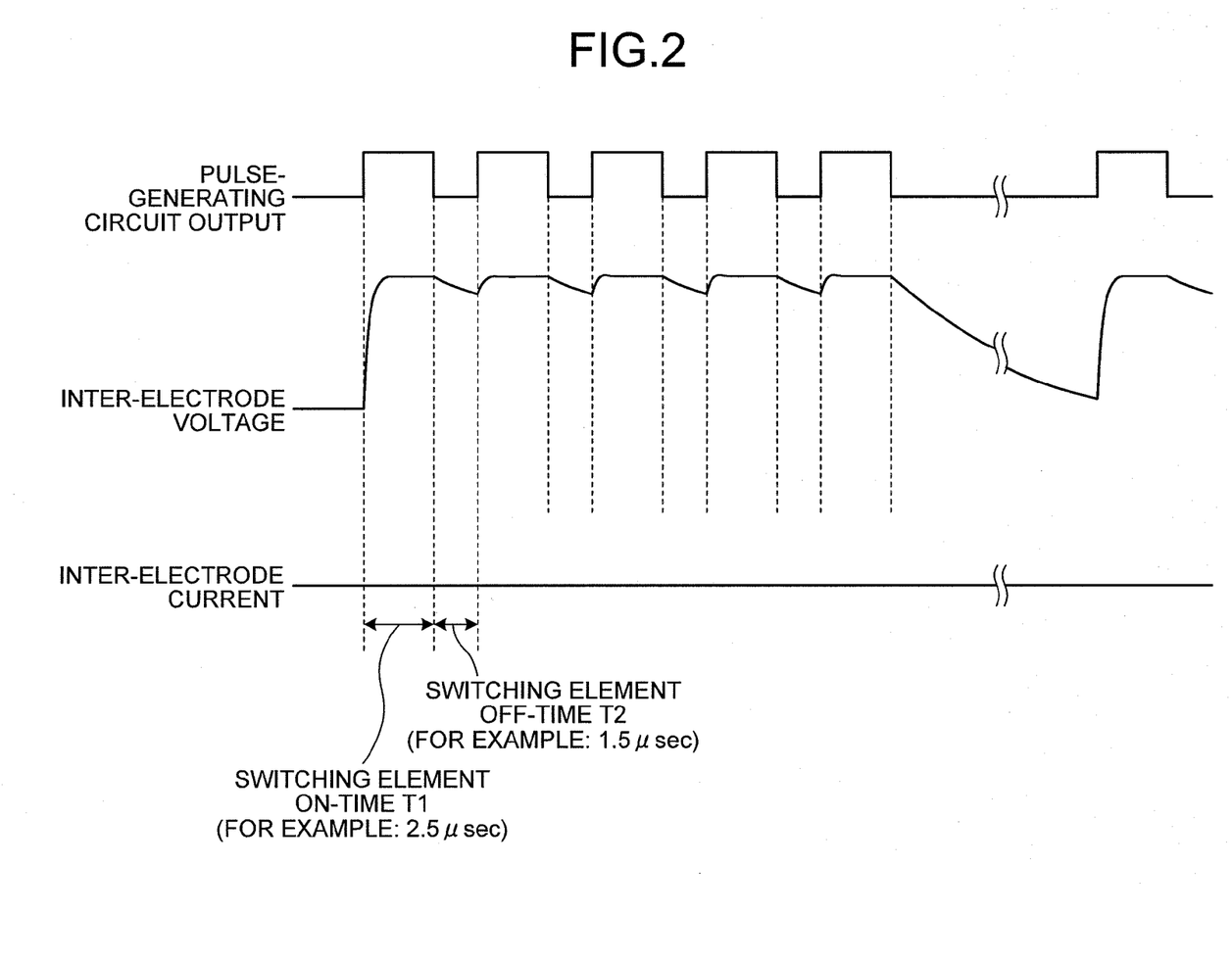
FIG. 2 depicts an inter-electrode voltage and an inter-electrode current when electrodes are opened in the electric discharge machining apparatus according to the first embodiment.
Figure 3:
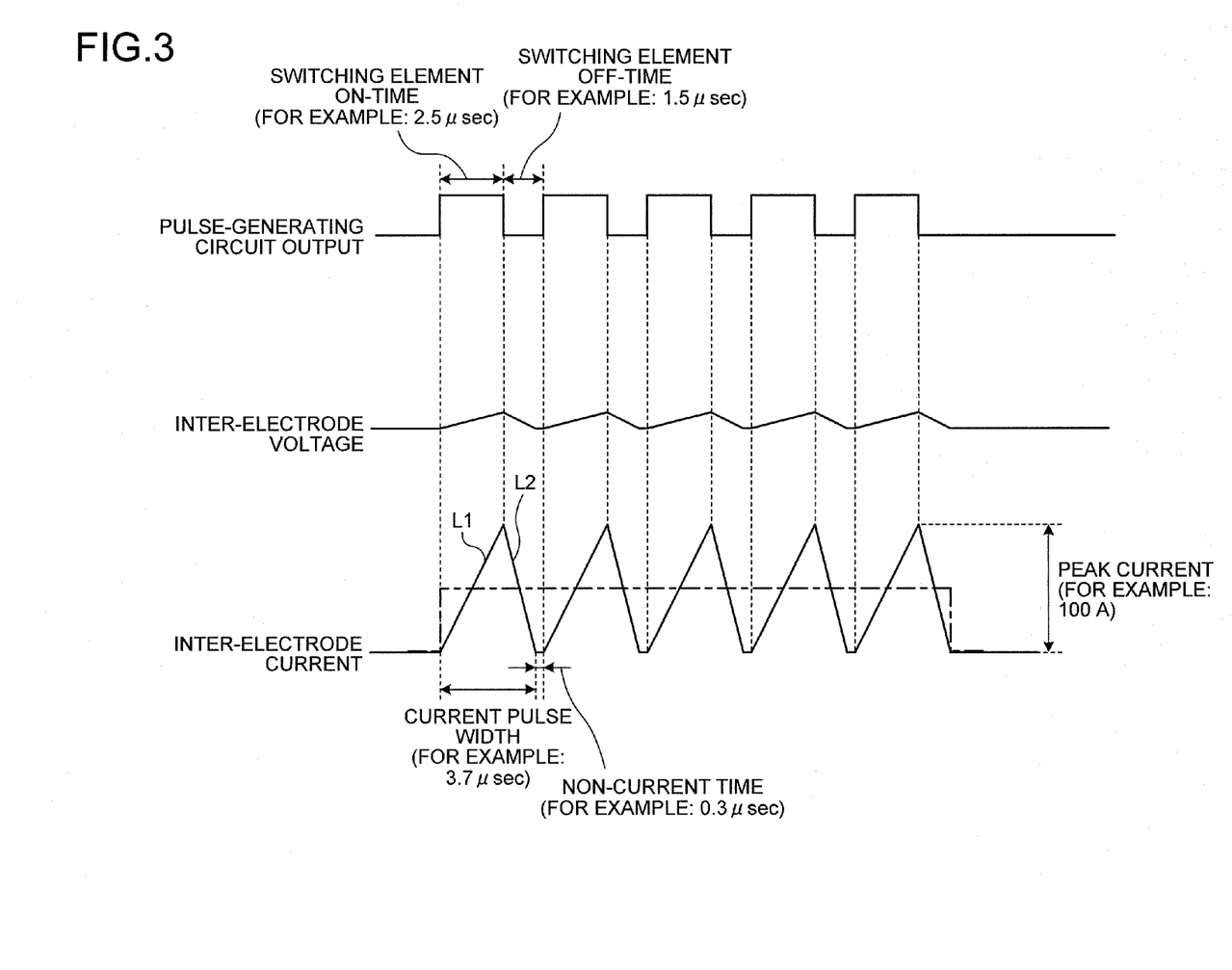
FIG. 3 depicts an inter-electrode voltage and an inter-electrode current when electric discharge occurs in the electric discharge machining apparatus according to the first embodiment.
Figure 4:
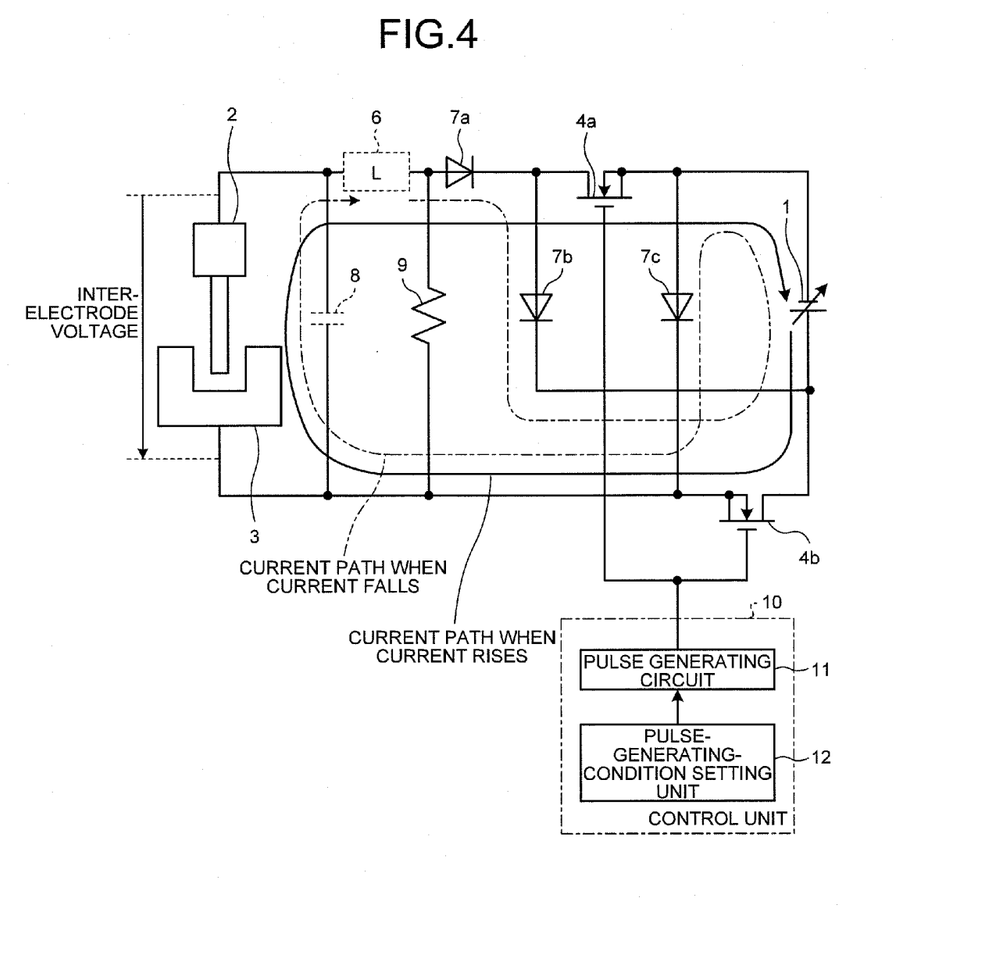
FIG. 4 depicts a path of a current flowing through an electric discharge machining apparatus on the circuit configuration in FIG. 1.

Next, the operation of the power supply device for an electric discharge machining apparatus according to the first embodiment is explained with reference to FIGS. 1 to 4. FIG. 2 depicts an inter-electrode voltage and an inter-electrode current when electrodes are opened, that is, when the inter-electrode current does not flow. FIG. 3 depicts an inter-electrode voltage and an inter-electrode current when electric discharge occurs, that is, when the inter-electrode current flows. FIG. 4 depicts the path of the current flowing through an electric discharge machining apparatus with the circuit configuration in FIG. 1.

In the power supply device for an electric discharge machining apparatus according to the first embodiment, a train of a predetermined number of pulses (hereinafter referred to as a "pulse train" and five pulses are exemplified in FIG. 2) that are on for a predetermined time T1 and are off for a predetermined time T2 as shown in the upper part of FIG. 2 is output from the pulse generating circuit 11 in the control unit 10. The switching elements 4a and 4b are simultaneously on/off-controlled by the pulse train to apply a DC voltage from the DC power supply 1 to the machining gap between the workpiece 3 and the machining electrode 2.

In this case, when the inter-electrode current does not flow (that is, when electric discharge does not occur), a DC voltage from the DC power supply 1 is applied to the stray capacitance 8 to charge the stray capacitance 8 by setting the pulse train to "ON". At this time, as shown in the middle part of FIG. 2, the inter-electrode voltage (the charging voltage) is maintained for a period during which the pulse train is "ON", and a part of the stored electric charge is discharged according to a time constant, substantially determined by the stray capacitance 8 and the resistance 9, for a period during which the pulse train is "OFF". The electric charging and electric discharging described above are repeated by the pulse train intermittently applied. After the pulse train is applied, the stored electric charge of the stray capacitance 8 is discharged, and the inter-electrode voltage decreases toward the zero level according to the time constant.

On the other hand, when an inter-electrode current flows (that is, when electric discharge occurs), the stored electric charge (charged energy) of the stray capacitance 8 is supplied to the machining gap. The path of the inter-electrode current (a current path) is as shown in FIG. 4. More specifically, the inter-electrode current rises at the timing at which the pulse train is set to "ON", and flows along the current path shown by a solid line originating from the positive electrode of the DC power supply 1→the switching element 4b→the workpiece 3→the machining electrode 2→the inductance 6→the diode 7a→the switching element 4a→the negative electrode of the DC power supply 1. Meanwhile, the inter-electrode current falls at the timing at which the pulse train is set to "OFF" and flows by using energy stored in the inductance 6 along a current path shown by the dot-and-dash line originating from the inductance 6→the diode 7a→the diode 7b→the positive electrode of the DC power supply 1→the negative electrode of the DC power supply 1→the diode 7c→the workpiece 3→the machining electrode 2→the inductance 6.

In this manner, the inter-electrode current flows as shown in the lower part of FIG. 3. It should be noted that since the stored electric charge of the stray capacitance 8 is supplied to the machining gap at the time of discharging, variations in the inter-electrode voltage are small as shown in the middle part of FIG. 3.

Next, the operation of relevant parts in the power supply device for an electric discharge machining apparatus according to the first embodiment is explained with reference to FIGS. 3 and 4, and the like.

For example, a waveform shown in the lower part of FIG. 3 is an inter-electrode current (a discharge current) waveform in which the on-time of the switching elements 4a and 4b is set to 2.5 μsec, and the off-time of the switching elements 4a and 4b is set to 1.5 μsec, that is, the on/off-time ratio is set to 1.5/2.5=0.6. A positive slope portion L1 of the inter-electrode current waveform is a current component that rises transitionally according to a time constant determined by the inductance component of the inductance 6 and by a resistance component (such as a resistance in the electric discharge machining apparatus including the resistance of the machining gap, machining fluid, a wiring resistance, and the on-resistance component of the switching elements 4a and 4b and the diode 7a) that is present on the current path when the switching elements 4a and 4b are set to "ON". The positive slope portion L1 rises substantially in a straight line as shown in FIG. 3. A negative slope portion L2 of the inter-electrode current waveform is a current component that falls according to a time constant determined by the inductance component of the inductance 6 and by a resistance component (such as the resistance in the electric discharge machining apparatus including the resistance of the machining gap and machining fluid, a wiring resistance, the on-resistance component of the diodes 7a to 7c and an internal resistance of the DC power supply 1) that is present on the current path when the switching elements 4a and 4b are set to "OFF". The negative slope portion L2 falls substantially in a straight line as shown in FIG. 3.

It is understood from the above descriptions that when a circuit configuration is determined, and then elements are selected, the slope of the positive slope portion L1 of the inter-electrode current waveform, at the time when the switching elements 4a and 4b are switched from off to on, is determined, and also the slope of the negative slope portion L2 of the inter-electrode current waveform, at the time when the switching elements 4a and 4b are switched from on to off, is determined.

TH following can be understood from the example in FIG. 3. The on-time of the switching elements 4a and 4b is set to 2.5 μsec, and the off-time of the switching elements 4a and 4b is set to 1.5 μsec. By having this setting, the time period during which the inter-electrode current does not flow (a non-current time) is 0.3 μsec, and the time period during which the inter-electrode current continues to flow (a current pulse width or a current continuation time) is 3.7 μsec. Accordingly, the ratio between the non-current time and the current pulse width (or the current continuation time) is set to $0.3/3.7 \cong 0.08$.

Figure 5:
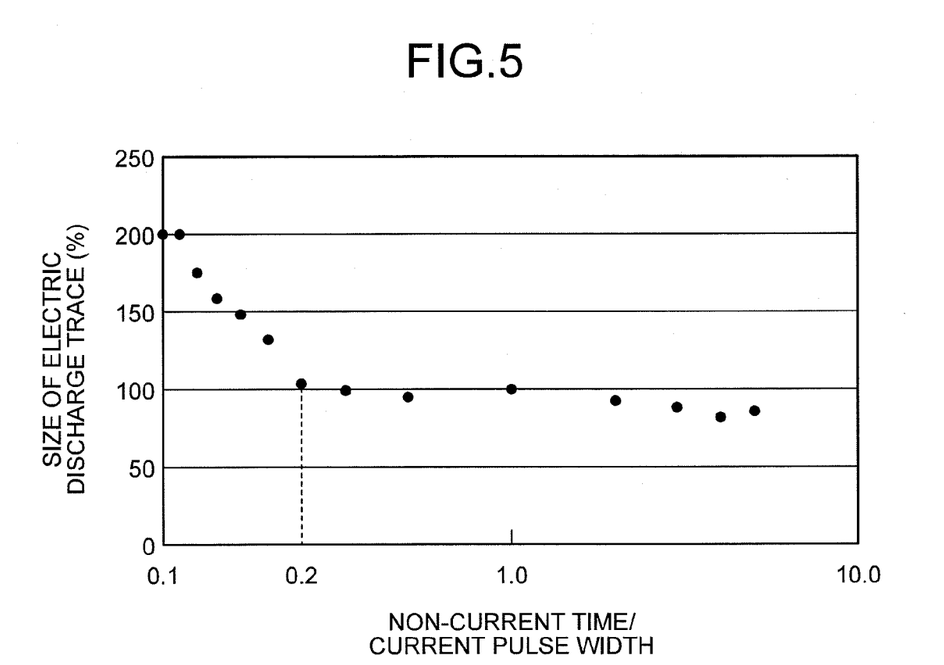
FIG. 5 is an example of a measurement result indicating a relationship between a current-pulse time ratio and the size of an electric discharge trace.

FIG. 5 is an example of a measurement result indicating the size of the electric discharge trace when machining is performed after changing the on/off-time ratio of the switching elements 4a and 4b. In FIG. 5, the horizontal axis represents the ratio between the non-current time and the current pulse width (hereinafter, "current-pulse time ratio"), and the vertical axis represents the size of the electric discharge trace caused by machining. The size of the electric discharge trace in a small-hole electric discharge machining device is regulated such that, for example, a hole diameter, which is obtained when machining is performed with the current-pulse time ratio of 1 under given conditions, is standardized as 1, and then the current-pulse time ratio is expressed as a percentage.

At least the following four points can be understood from FIG. 5.
(1) As the current-pulse time ratio becomes lower, the size of the electric discharge trace becomes larger.
(2) The size of the electric discharge trace has flat characteristics when the current-pulse time ratio is equal to or higher than 0.2, and is larger when the current-pulse time ratio is equal to or lower than 0.2.
(3) The size of the electric discharge trace when the current-pulse time ratio is equal to 0.1 is about twice as large as the size of the electric discharge trace when the current-pulse time ratio is equal to 1.0.
(4) Although there is no measurement data when the current-pulse time ratio is lower than 0.1, there is a tendency for the size of the electric discharge trace to not increase any further when the current-pulse time ratio is around 0.1.

The low current-pulse time ratio means a high concentration of current energy. Therefore, the machining speed becomes higher when machining is performed using a current pulse with a lower current-pulse time ratio than when machining is performed using a current pulse with a higher current-pulse time ratio. Accordingly, the current-pulse time ratio is equal to 0.2 (=1/5) or a value around 0.2 (=1/5) is thought to be a preferable set value that can increase the machining speed while maintaining machining accuracy.

The current-pulse time ratio that is equal to 0.1 (=1/10) is a set value for performing machining with more focus on the machining speed than the machining precision. As described above, in a case of this set value, the size of the electric discharge trace is about twice as large as that when the current-pulse time ratio is equal to 1.0. However, in a case of the small-hole electric discharge machining device, the diameter of the machining electrode 2 can be reduced to compensate for a decrease in the machining precision. Therefore, when the current-pulse time ratio is set equal to or lower than 0.1 (=1/10), the machining speed is further increased while maintaining a given level of machining precision or higher.

As a comparison of the two cases described above, when the current-pulse time ratio is set equal to or higher than 0.1 (=1/10) and also equal to or lower than 0.2 (=1/5), an effect such that both the machining speed and the machining precision are improved can be obtained.

By setting the current-pulse time ratio preferably to be equal to or lower than 1/5, and more preferably to be equal to or lower than 1/10, it is possible to perform machining in which the non-current time is shortened. Therefore, when the entire pulse train is considered, it seems that machining is performed by applying a pseudo rectangular pulse in which the entire pulse train is treated as 1 pulse (a 20-μsec rectangular pulse in an example in FIG. 3), as shown by a dot-and-dash line in FIG. 3. Accordingly, the effect of increasing the energy density for each electric discharge machining can be also obtained.

The power supply device for an electric discharge machining apparatus according to the preset embodiment is configured not to include a resistance between the DC power supply 1 and the machining electrode 2, and is configured to restrict the inter-electrode current flowing through the machining gap by using the inductance 6 that is present in a series circuit including the DC power supply 1 and the switching elements 4a and 4b. Therefore, the effect of reducing the heat generation amount as compared with the case of flowing a rectangular waveform current with the same peak value can be obtained.

While FIG. 3 exemplifies a case where the magnitude of the peak current is 100 amperes, this magnitude is not limited thereto, and it can be set within a range of 15 to 150 amperes, for example. When the peak current is higher, it is possible to perform machining on materials that are difficult to cut, such as ultrahard alloy. When the peak current is lower, the machining precision can be higher.

While FIG. 3 exemplifies a case where the current pulse width is 3.7 μsec, this pulse width is not limited thereto, and it can be set within a range of 0.3 to 10.0 μsec, for example. When the current pulse width is larger, the peak current can be higher. Therefore, it is possible to perform machining on materials that are difficult to cut, such as ultrahard alloy. When the current pulse width is smaller, the peak current can be lower, and therefore the machining precision and surface roughness can be improved.

It is possible to set the current pulse width and the magnitude of the peak current independently. For example, when the peak current is 15 amperes, the current pulse width can be set to 0.3 μsec or to 10.0 μsec. For another example, when the peak current is 150 amperes, the current pulse width can be set to 0.3 μsec or to 10.0 μsec. The reason why the current pulse width and the magnitude of the peak current can be changed independently even though the inductance is fixed is because the DC power supply 1 is a voltage-variable power supply as shown in FIG. 1. This means that by changing the voltage of the DC power supply 1, it is possible to change the current pulse width and the peak current independently to those appropriate to the machining speed and the machining precision.

As explained above, in the power supply device for an electric discharge machining apparatus according to the first embodiment and in an electric discharge machining method, an inductance component that is present on a series circuit including a DC power supply and a switching element is utilized to generate a current pulse having a triangular waveform, and also the switching element is controlled in order such that a current-pulse time ratio that is a ratio between a non-current time and a current continuation time in the current pulse is equal to or lower than 1/5 and also equal to or higher than 1/10. Therefore, it is possible to improve both the machining speed and machining precision while suppressing an increase in a heat generation amount.

The above current-pulse time ratio may also be set to 1/5 or to a value around 1/5. Therefore, it is possible to increase the machining speed while maintaining the machining precision.

The above current-pulse time ratio may also be set to 1/10 or lower. Therefore, it is possible to further increase the machining speed while maintaining a given level of machining precision or higher.

Second Embodiment

Figure 6:
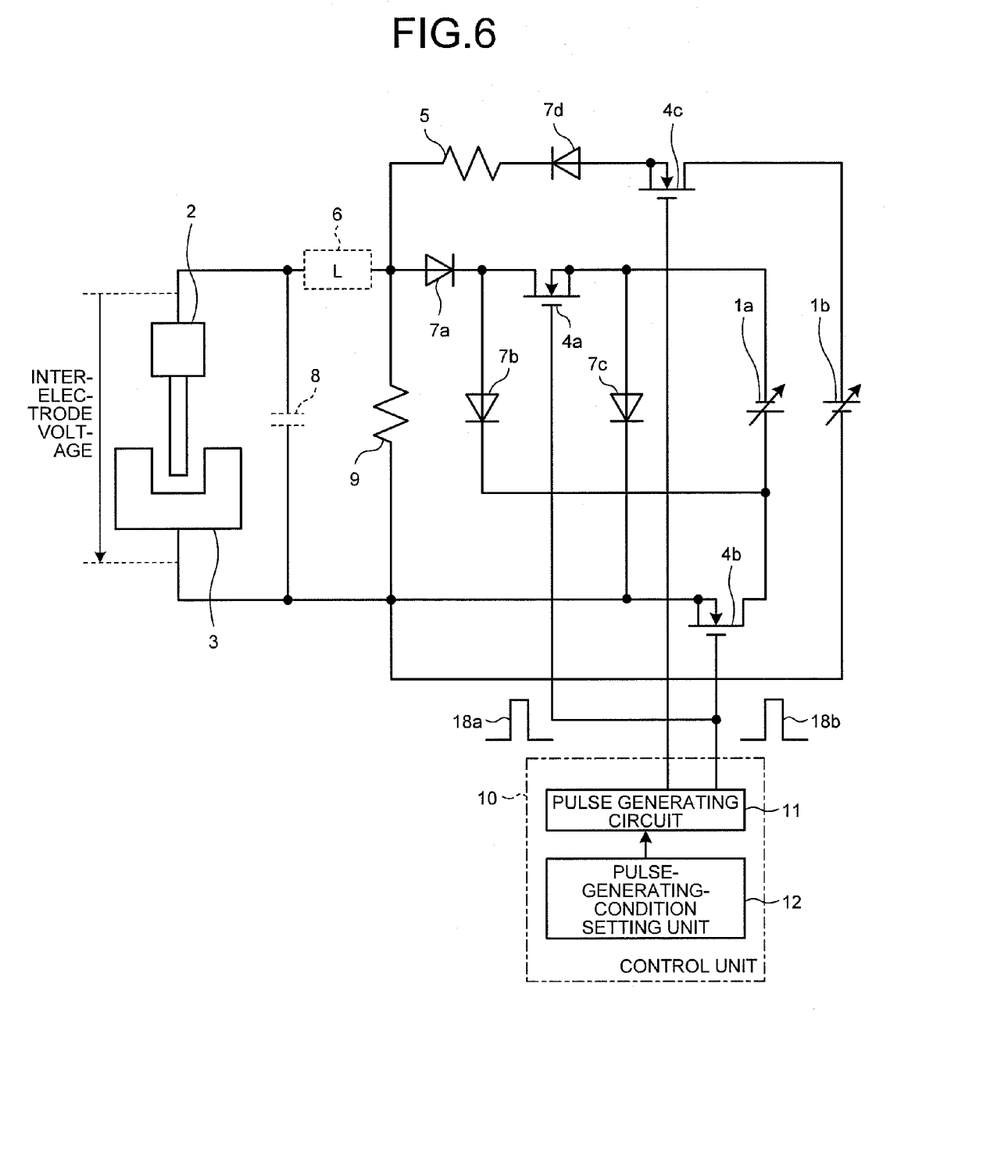
FIG. 6 is a configuration example of an electric discharge machining apparatus including a power supply device for an electric discharge machining apparatus according to a second embodiment.

FIG. 6 is a configuration example of an electric discharge machining apparatus including a power supply device for an electric discharge machining apparatus according to a second embodiment. The power supply device for an electric discharge machining apparatus according to the first embodiment shown in FIG. 1 can only generate normal-polarity current pulses. In contrast, the power supply device for the electric discharge machining apparatus shown in FIG. 6 is capable of generating a bipolar (normal-polarity and reverse-polarity) current pulse, and is provided additionally with a DC power supply 1b, a switching element 4c, a diode 7d, and a resistance 5.

In FIG. 6, the DC power supply 1b, the switching element 4c, the diode 7d and the resistance 5 are connected in series. One end of the resistance 5 is connected to a connection end between the inductance 6 and the diode 7a, and the other end of the resistance 5 is connected to the cathode end of the diode 7d. A source end of the switching element 4c is connected to the anode end of the diode 7d, and the drain end of the switching element 4c is connected to the positive electrode of the DC power supply 1b. The negative electrode of the DC power supply 1b is connected to a connection end between the switching element 4b and the workpiece 3. Other configurations of the second embodiment are identical or equivalent to those of the first embodiment, and thus, except that the DC power supply 1 shown in FIG. 1 is shown as "DC power supply 1a" in FIG. 6, constituent parts common to both embodiments are denoted by the same or like reference signs and redundant explanations thereof will be omitted.

Figure 7:
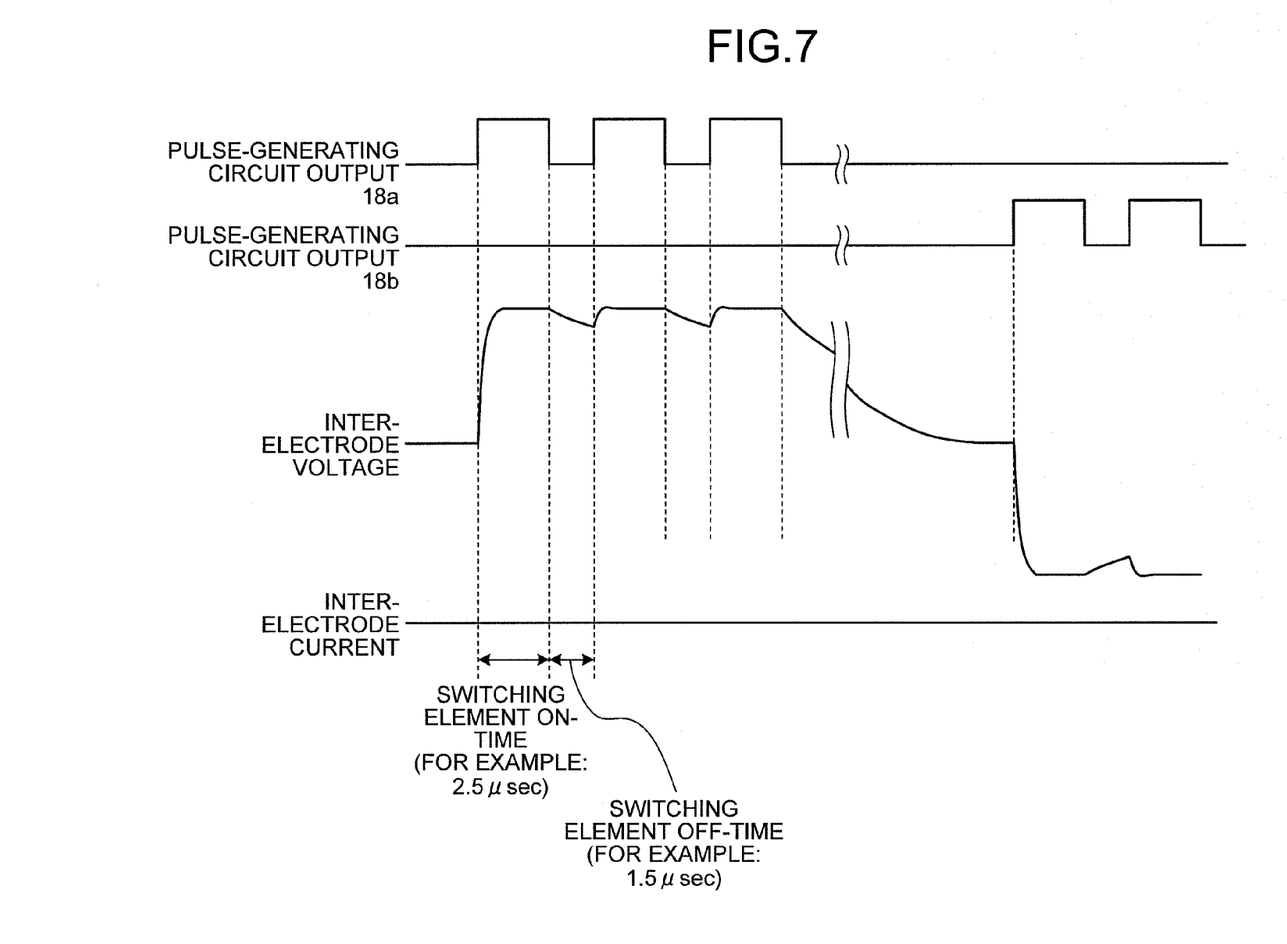
FIG. 7 depicts an inter-electrode voltage and an inter-electrode current when electrodes are opened in the electric discharge machining apparatus according to the second embodiment.
Figure 8:
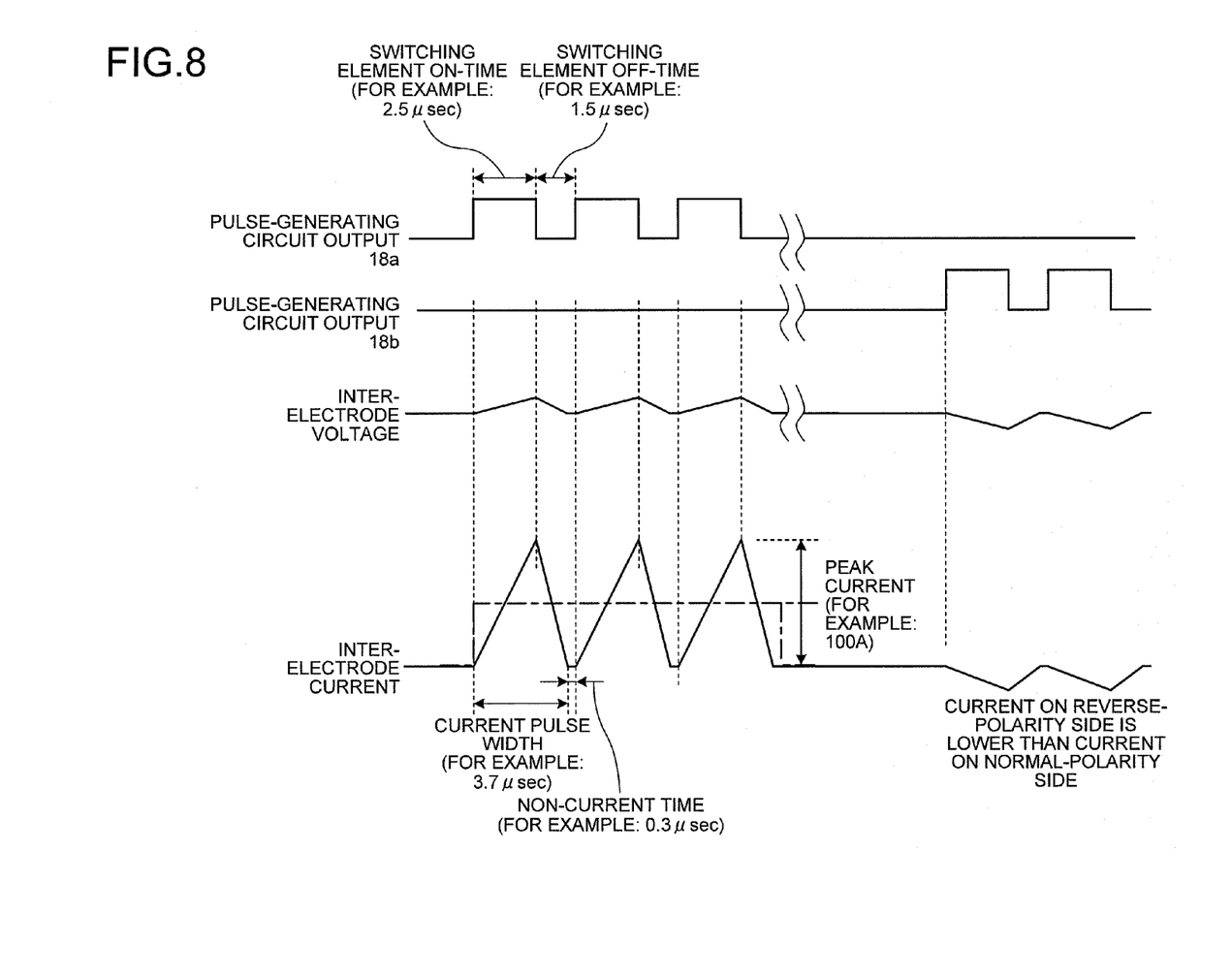
FIG. 8 depicts an inter-electrode voltage and an inter-electrode current when electric discharge occurs in the electric discharge machining apparatus according to the second embodiment.
Figure 9:
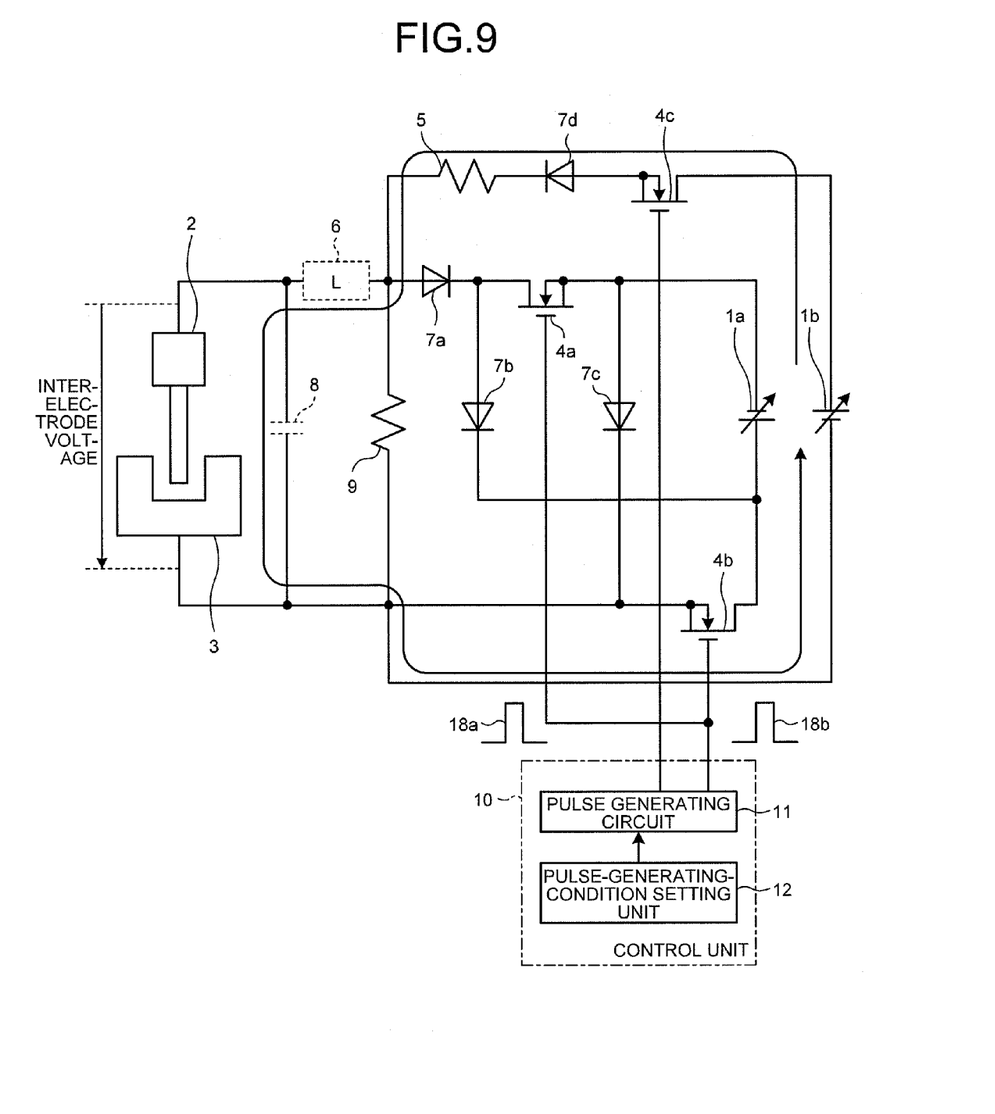
FIG. 9 depicts a path of a reverse-polarity current flowing through an electric discharge machining apparatus on a circuit configuration in FIG. 6.

Next, an operation of the power supply device for an electric discharge machining apparatus according to the second embodiment is explained with reference to FIGS. 7 to 9. FIG. 7 depicts an inter-electrode voltage and an inter-electrode current when electrodes are opened, that is, when the inter-electrode current does not flow. FIG. 8 depicts an inter-electrode voltage and an inter-electrode current when electric discharge occurs, that is, when the inter-electrode current flows. FIG. 9 depicts the path of the reverse-polarity current flowing through the electric discharge machining apparatus in the circuit configuration in FIG. 6. The operation when a normal-polarity pulse current flows is identical or equivalent to that in the first embodiment. Therefore, only the operation when a reverse-polarity pulse current flows is explained here.

In FIGS. 7 and 8, a pulse-generating circuit output 18a is a normal-polarity pulse train (a plurality of pulses). In contrast, a pulse-generating circuit output 18b is a reverse-polarity pulse train (a pulse group). The reason for using bipolar pulse groups is to prevent electrolytic corrosion. When an oil-based machining fluid is used as the machining fluid, electrolytic action has almost no effect. However, when pure water is used as a machining fluid or when a mixture of a polymer compound and a water-based machining fluid is used, electrolytic corrosion may occur on the machining material side, and it can damage the processed surface. As described in the present embodiment, using the bipolar (AC) pulse groups to perform machining can prevent the electrolytic corrosion as described above.

A current path when the reverse-polarity pulse current flows is as shown in FIG. 9. An inter-electrode current flows along a current path shown by the solid line originating from the positive electrode of the DC power supply 1b→the switching element 4c→the diode 7d→the resistance 5→the inductance 6→the machining electrode 2→the workpiece 3→the negative electrode of the DC power supply 1b. While there is no resistance on the current path through which the normal-polarity current flows, there is the resistance 5 on the current path through which the reverse-polarity current flows. The resistance 5 functions as a current restricting resistance that prevents electric discharge on the reverse-polarity side, which leads to the exhaustion of the machining electrode. The current on the reverse-polarity side is suppressed by the function of the resistance 5, and it becomes lower than the current on the normal-polarity side, as shown by a waveform in the lower part of FIG. 8.

Third Embodiment

In the third embodiment, a switching element and a diode that are included in a power supply device for an electric discharge machining apparatus are explained. A typical switching element used in the power supply device for an electric discharge machining apparatus is a semiconductor switching element of a silicon (Si) material (such as a metal oxide semiconductor filed-effect transistor (MOSFET) and an insulated-gate bipolar transistor (IGBT), and it is hereinafter abbreviated as "Si-SW"). A typical diode used in a power supply device for an electric discharge machining apparatus is a semiconductor diode of an Si material (such as a PN junction diode and a shot key barrier diode, and hereinafter abbreviated as "Si-D"). The technique explained in the first embodiment can use these typical Si-SW and Si-D.

However, the techniques explained in the first and second embodiments are not limited to using these Si-SW and Si-D. It is certainly possible to use a semiconductor switching element of a silicon carbide (SiC) material, which has been paid attention in recent years, in place of the Si material and to use a semiconductor diode of a SiC material respectively as the above switching element and diode of the power supply device for an electric discharge machining apparatus.

SiC has such characteristics that it can be used at a high temperature. Therefore, when a switching element and a diode of a SiC material are used respectively as a switching element and a diode that are included in the power supply device for an electric discharge machining apparatus, the allowable operation temperature of the switching element and the diode can be increased. Accordingly, it is possible to reliably avoid problems with the heat generation amount. Consequently, an upper limit value of a peak current can be increased by using an SiC element, and it is possible to achieve enhanced machining ability.

Furthermore, SiC has such characteristics that it can operate at a high speed. Therefore, when a switching element and a diode of an SiC material are used respectively as a switching element and a diode that are included in the power supply device for an electric discharge machining apparatus, the operation speed of the switching element and the diode can be increased. Accordingly, the current pulse width can be further reduced by using the SiC element, and it is possible to achieve improvement in machining precision and surface roughness.

SiC is an example of a semiconductor referred to as a "wide bandgap semiconductor" because of its wider bandgap properties than Si (in contrast thereto, Si is referred to as a "narrow bandgap semiconductor"). In addition to SiC, a semiconductor formed of a gallium nitride-based material or diamond also belongs to the wide bandgap semiconductor. Their properties are similar to those of SiC in many respects. Therefore, configurations using wide bandgap semiconductors made of materials other than silicon carbide are also included in the scope of the present invention.

Furthermore, a switching element and a diode that are formed from a wide bandgap semiconductor as described above have a high voltage resistance and a high allowable current density. Therefore, it is possible to downsize the switching element and the diode. Accordingly, by using these downsized switching element and diode, it is possible to downsize a semiconductor module having these elements incorporated therein.

Further, the switching element formed from the wide bandgap semiconductor has a high heat resistance. Therefore, in the case of a switching element that requires a cooling mechanism such as a heat sink, it is possible to downsize the cooling mechanism, and accordingly it is possible to further downsize the switching element module.

The configurations described in the first to third embodiments are only examples of the configurations of the present invention. The configurations can be combined with other well-known techniques, and it is needless to mention that the present invention can be configured while modifying it without departing from the scope of the invention, such as omitting a part of the configuration.

Industrial Applicability

As described above, the present invention is useful as a power supply device for an electric discharge machining apparatus that can increase the machining speed and suppress an increase in the heat generation amount when compared to conventional devices.

Reference Signs List 1, 1a, 1b DC power supply
2 machining electrode
3 workpiece
4a, 4b, 4c switching element
5, 9 resistance
6 inductance
7a, 7b, 7c, 7d diode
8 stray capacitance
10 control unit
11 pulse generating circuit
12 pulse-generating-condition setting unit
18a pulse-generating circuit output
18b pulse-generating circuit output

The invention claimed is:

1. A power supply device for an electric discharge machining apparatus, the power supply device comprising:
a series circuit that includes a DC power supply and switching elements for supplying DC or AC current pulses to a machining gap between a machining electrode and a workpiece; and
a control unit that controls the switching elements, wherein when the control unit repeatedly generates a current pulse having a triangular waveform by an inductance component that is present in the series circuit, the control unit controls the switching elements in order that a current-pulse time ratio that is a ratio between a non-current time, during which no current flows through the machining gap, and a current continuation time, during which current flows through the machining gap, in the current pulse is equal to or lower than 1/5, and
one triangular waveform is formed during the current continuation time, and the non-current time comes after the current continuation time for each current pulse.

2. The power supply device for an electric discharge machining apparatus according to claim 1, wherein the control unit controls the switching elements in order that the current-pulse time ratio is equal to or lower than 1/10.

3. The power supply device for an electric discharge machining apparatus according to claim 1, wherein the control unit controls the switching elements in order that a pulse width of the current pulse is set within a range of 0.3 to 10.0 μsec.

4. The power supply device for an electric discharge machining apparatus according to claim 1, wherein the control unit controls the switching elements in order that a peak value of the current pulse is set within a range of 15 to 150 amperes.

5. The power supply device for an electric discharge machining apparatus according to claim 1, wherein the switching elements included in the series circuit are switching elements formed from a wide bandgap semiconductor.

6. The power supply device for an electric discharge machining apparatus according to claim 5, wherein the wide bandgap semiconductor is a semiconductor using silicon carbide, a gallium nitride-based material, or diamond.

7. An electric discharge machining method, wherein
a series circuit that includes a DC power supply and switching elements for supplying DC or AC current pulses to a machining gap between a machining electrode and a workpiece is included, and
a current pulse formed into a triangular waveform by an inductance component that is present in the series circuit is intermittently and repeatedly supplied to the machining gap, thereby machining the workpiece, wherein
the switching elements are controlled in order that a current-pulse time ratio that is a ratio between a non-current time, during which no current flows through the machining gap, and a current continuation time, during which current flows through the machining gap, in the current pulse is equal to or lower than 1/5, and also equal to or higher than 1/10, and
one triangular waveform is formed during the current continuation time, and the non-current time comes after the current continuation time for each current pulse.

8. An electric discharge machining method, wherein
a series circuit that includes a DC power supply and switching elements for supplying DC or AC current pulses to a machining gap between a machining electrode and a workpiece is included, and
a current pulse formed into a triangular waveform by an inductance component that is present in the series circuit is intermittently and repeatedly supplied to the machining gap, thereby machining the workpiece, wherein
the switching elements are controlled in order that a current-pulse time ratio that is a ratio between a non-current time, during which no current flows through the machining gap, and a current continuation time, during which current flows through the machining gap, in the current pulse is equal to or lower than 1/10, and
one triangular waveform is formed during the current continuation time, and the non-current time comes after the current continuation time for each current pulse.

9. An electric discharge machining method, wherein
a series circuit that includes a DC power supply and switching elements for supplying DC or AC current pulses to a machining gap between a machining electrode and a workpiece is included, and
a current pulse formed into a triangular waveform by an inductance component that is present in the series circuit is intermittently and repeatedly supplied to the machining gap, thereby machining the workpiece, wherein
the switching elements are controlled in order that a current-pulse time ratio that is a ratio between a non-current time, during which no current flows through the machining gap, and a current continuation time, during which current flows through the machining gap, in the current pulse is 1/5 or a value around 1/5, and
one triangular waveform is formed during the current continuation time, and the non-current time comes after the current continuation time for each current pulse.

\* \* \* \* \*